United States Patent
Wu et al.

(10) Patent No.: US 12,492,902 B2
(45) Date of Patent: Dec. 9, 2025

(54) MODULATION METHODS AND SYSTEMS FOR NON-RECIPROCAL KERR REDUCTION IN RESONATOR FIBER OPTIC GYROSCOPES

(71) Applicant: Honeywell International Inc., Charlotte, NC (US)

(72) Inventors: Jianfeng Wu, Tucson, AZ (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 841 days.

(21) Appl. No.: 17/846,914

(22) Filed: Jun. 22, 2022

(65) Prior Publication Data

US 2025/0314495 A1    Oct. 9, 2025

(51) Int. Cl.
G01C 19/72    (2006.01)
G01C 25/00    (2006.01)

(52) U.S. Cl.
CPC ......... G01C 19/722 (2013.01); G01C 25/005 (2013.01)

(58) Field of Classification Search
CPC ............................ G01C 19/722; G01C 25/005
See application file for complete search history.

(56) References Cited

U.S. PATENT DOCUMENTS

| | | |
|---|---|---|
| 4,673,293 A | 6/1987 | Sanders |
| 5,296,912 A | 3/1994 | Strandjord et al. |
| 5,349,441 A | 9/1994 | Sanders |
| 5,465,149 A | 11/1995 | Strandjord et al. |
| 5,627,644 A | 5/1997 | Sanders |
| 6,046,810 A | 4/2000 | Sanders et al. |
| 7,522,284 B2 | 4/2009 | Sanders et al. |
| 7,777,889 B2 | 8/2010 | Qiu et al. |
| 7,844,152 B2 | 11/2010 | Sanders |
| 7,855,789 B2 | 12/2010 | Strandjord et al. |
| 7,889,350 B2 | 2/2011 | Qiu et al. |
| 8,098,380 B2 | 1/2012 | Sanders et al. |

(Continued)

OTHER PUBLICATIONS

European Patent Office, "Extended European Search Report", from EP Application No. 23166231.3, from Foreign Counterpart to U.S. Appl. No. 17/846,914, filed Nov. 6, 2023, pp. 1 through 9, Published: EP.

*Primary Examiner* — Georgia Y Epps
*Assistant Examiner* — Don J Williams
(74) *Attorney, Agent, or Firm* — Fogg & Powers LLC

(57) ABSTRACT

A method comprises providing an RFOG that includes a resonator in communication with a light source emitting a first signal at a first power level in a CW direction, and a light source emitting a second signal at a second power level in a CCW direction; adding a common intensity modulation to the first signal, to produce an intensity modulated CW signal; adding the same common intensity modulation to the second signal, to produce an intensity modulated CCW signal; introducing the intensity modulated CW signal into the resonator; introducing the intensity modulated CCW signal into the resonator; detecting modulated rate signals that are output from the resonator at a common intensity modulation frequency; and adjusting a power level ratio between the first and second power levels, to determine a modified power level ratio value where a Kerr effect bias instability due to an asymmetrical loss distribution is reduced or eliminated.

20 Claims, 7 Drawing Sheets

(56) References Cited

U.S. PATENT DOCUMENTS

| | | |
|---|---|---|
| 8,908,187 B2 | 12/2014 | Strandjord et al. |
| 9,702,700 B2 | 7/2017 | Lefevre et al. |
| 9,857,176 B2 * | 1/2018 | Celikel ................ G01C 19/725 |
| 10,914,587 B1 | 2/2021 | Sanders et al. |
| 2012/0307253 A1 | 12/2012 | Sanders et al. |
| 2015/0316382 A1 | 11/2015 | Sanders et al. |
| 2021/0333106 A1 | 10/2021 | Wu et al. |
| 2022/0128362 A1 | 4/2022 | Krueger et al. |

\* cited by examiner

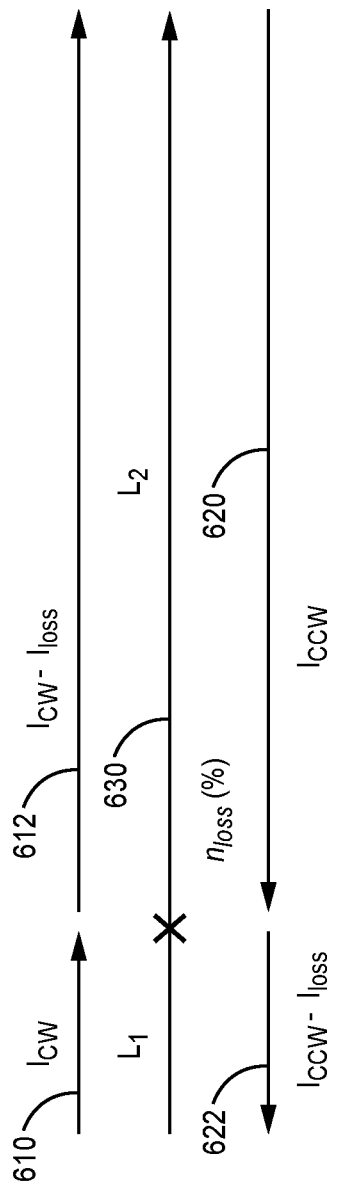
FIG. 6
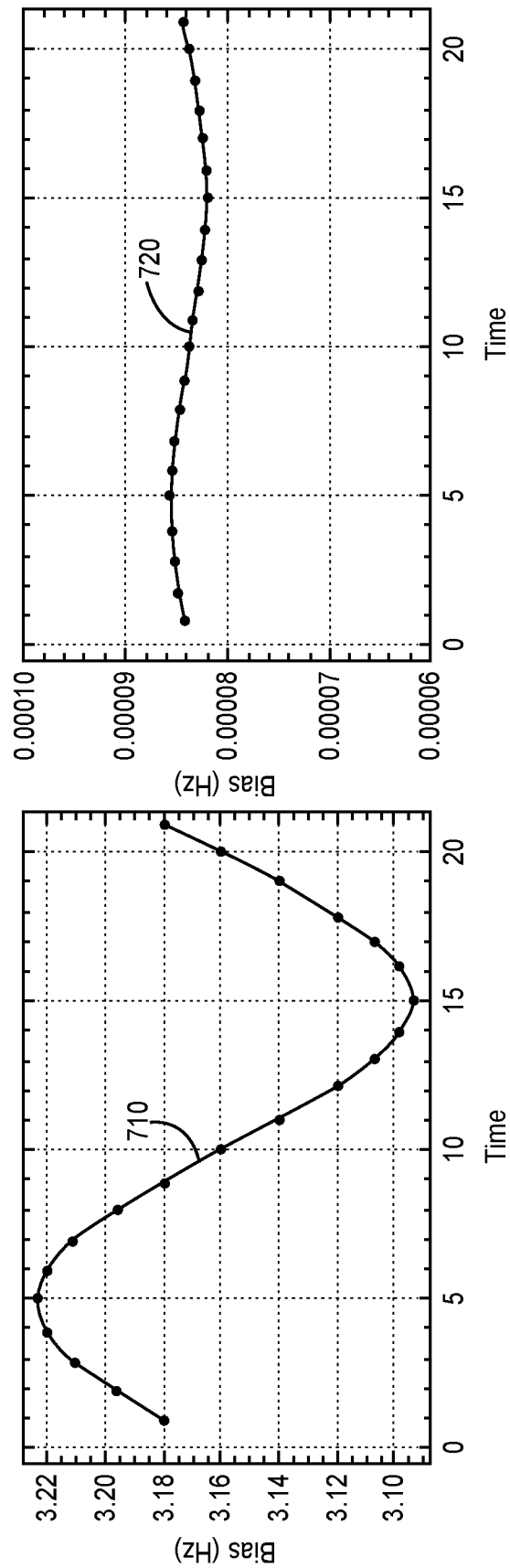
FIG. 7B
FIG. 7A

MODULATION METHODS AND SYSTEMS FOR NON-RECIPROCAL KERR REDUCTION IN RESONATOR FIBER OPTIC GYROSCOPES

STATEMENT REGARDING FEDERALLY SPONSORED RESEARCH OR DEVELOPMENT

This invention was made with Government support under FA9453-20-C-0013 awarded by Air Force Research Laboratory. The Government has certain rights in the invention.

BACKGROUND

Resonator fiber optic gyroscopes are a promising next generation gyroscope technology that meets various needs in many navigation and inertial stabilization markets. The resonator fiber optic gyroscope (RFOG) is a navigation gyroscope that typically uses two optical signals, where one optical signal propagates around a resonator in a clockwise (CW) direction and the other optical signal propagates in a counter-clockwise (CCW) direction. Two different lasers are employed to eliminate the bias error due to back reflection. The RFOG is susceptible to errors, which can vary with a temperature of the core of an optical fiber of the resonator. One such error occurs in the bias, which represents an offset error in measured rotation rate.

The optical Kerr effect is a fundamental bias error source in an RFOG and often creates bias noise higher than navigational grade requirements. The Kerr effect is caused by the different phase shifts between the self-phase modulation (SPM) and cross-phase modulation (XPM) phenomenon. The SPM due to the copropagating CW beam generates less phase shift than the XPM due to the counter-propagating CCW beam in the RFOG. Therefore, if the CW and CCW beams encounter differential power fluctuations, the RFOG will have a non-reciprocal phase shift and cause bias error.

Prior approaches for Kerr effect reduction focuses on differential power stabilization. A common method is to reduce the Kerr bias error by stabilizing the CW and CCW beam power. But the asymmetry Kerr bias error is sensitive to even common intensity fluctuation. Moreover, the intensity stabilization loop does not reduce the Kerr bias error due to common loss change in the cavity.

SUMMARY

Modulation methods and systems for non-reciprocal Kerr reduction in a resonator fiber optic gyroscope (RFOG) is disclosed. One method comprises providing an RFOG that comprises an optical resonator in optical communication with a first light source that emits a first optical signal at a first power level in a clockwise (CW) direction, and a second light source that emits a second optical signal at a second power level in a counterclockwise (CCW) direction; adding a common intensity modulation to the first optical signal emitted from the first light source, to adjust the first power level and produce an intensity modulated CW signal; adding the same common intensity modulation to the second optical signal emitted from the second light source, to adjust the second power level and produce an intensity modulated CCW signal; providing means to equalize a modulation amplitude between the first and second optical signals; introducing the intensity modulated CW signal into the optical resonator such that the intensity modulated CW signal propagates in a CW direction in the optical resonator; introducing the intensity modulated CCW signal into the optical resonator such that the intensity modulated CCW signal propagates in a CCW direction in the optical resonator; detecting modulated rate signals that are output from the optical resonator at a common intensity modulation frequency; adjusting a power level ratio between the first and second power levels of the first and second optical signals based on the common intensity modulation frequency, to determine a modified power level ratio value where a Kerr effect bias instability due to an asymmetrical loss distribution in the RFOG is reduced or eliminated; and maintaining the modified power level ratio value in the RFOG such that the Kerr effect bias instability is reduced or eliminated.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 6 is graphical diagram representing an asymmetric loss distribution in an optical resonator of an RFOG according to one example;

FIG. 7A is an example graph of bias with respect to time for clockwise (CW) and counterclockwise (CCW) beams in an RFOG, prior to adjusting a power ratio of the beams to reduce bias sensitivity;

FIG. 7B is an example graph of bias with respect to time for CW and CCW beams in an RFOG, after adjusting the power ratio of the beams to reduce bias sensitivity.

DETAILED DESCRIPTION

Figure 1:
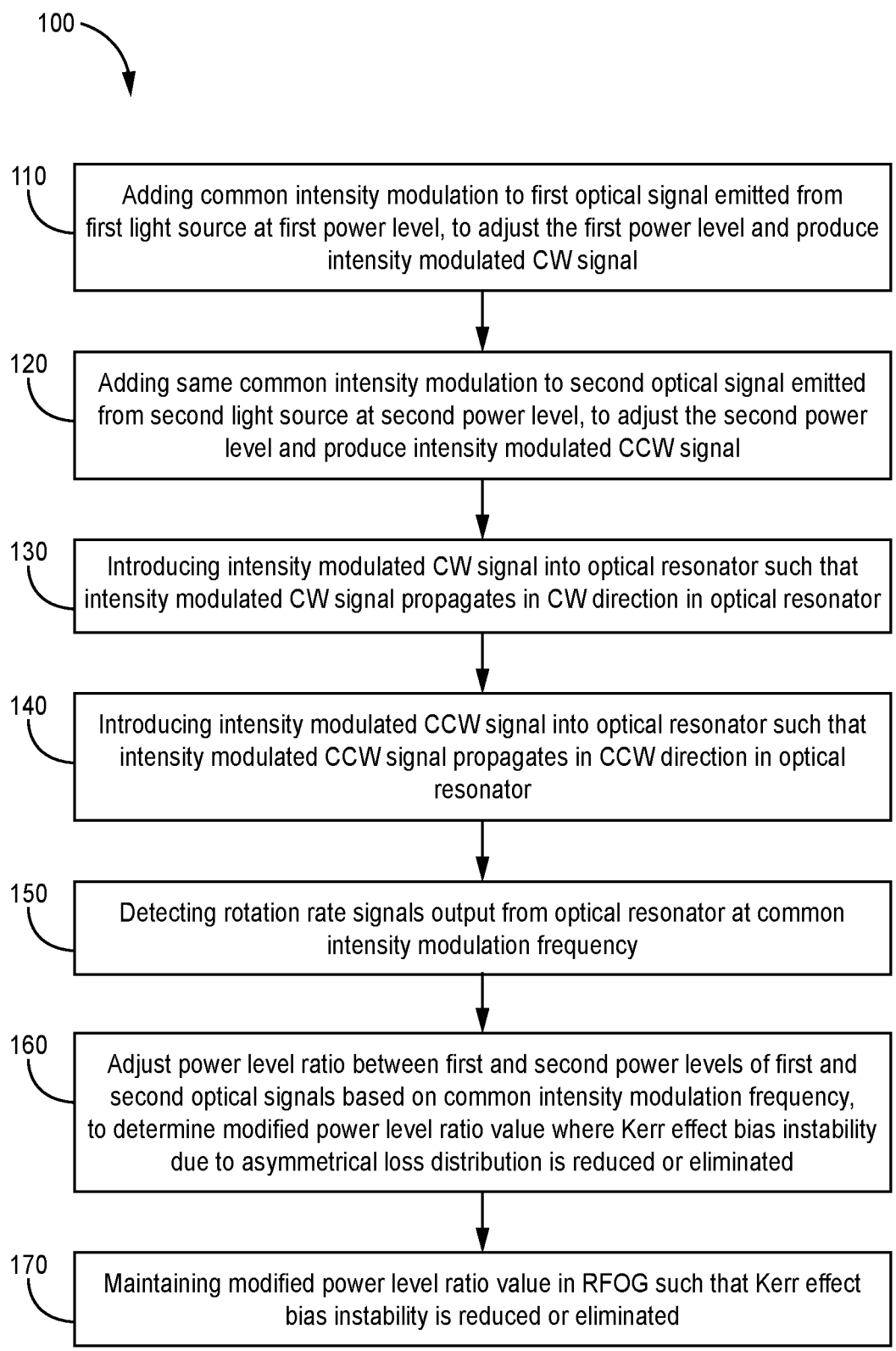
FIG. 1 is flow diagram of a method for reducing or eliminating Kerr effect bias sensitivity in a resonator fiber optic gyroscope (RFOG) by using common intensity modulation, according to one exemplary implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Modulation methods and systems for reducing or eliminating Kerr effect bias instability in resonator fiber optic gyroscopes are described herein.

In developing the present methods and systems, the discovery was made that common loss variations change the beam intensity distributions non-reciprocally and generate Kerr bias error in a resonator fiber optic gyroscope (RFOG). In the present methods, the clockwise (CW) and counter-clockwise (CCW) input power is balanced to make the intensity distributions the same. This eliminates or reduces the Kerr bias due to asymmetrical loss distribution. The present methods can reduce the Kerr bias error below navigation grade level.

The common loss and power change in a resonator cavity of the RFOG can also cause non-reciprocal phase shifts. The present approach provides a method to minimize the Kerr effect due to common loss and power variations.

In one approach, a method for reducing or eliminating Kerr effect bias sensitivity in a resonator fiber optic gyroscope (RFOG) uses a common intensity modulation scheme. In this approach, a common intensity modulation is applied to the CW and CCW beams. If the power distribution between the CW and CCW beams is not balanced, the intensity modulation will create a bias modulation signal. This bias modulation signal can be used as an indicator for non-reciprocal intensity distribution. The Kerr bias due to asymmetrical loss distribution is minimized by balancing the CW and CCW input power.

In another approach, a method for reducing or eliminating Kerr effect bias sensitivity uses a common loss modulation scheme. In this approach, a polarization state in the optical resonator of the RFOG is adjusted to modify a cavity loss in the optical resonator and create a loss modulation. In one technique, a piezoelectric transducer (PZT) coupled to the optical resonator is used to apply pressure to a fiber of the optical resonator to adjust the loss due to the polarization change. The polarization state of the resonator changes and modifies the cavity loss.

In another technique using a common loss modulation scheme, two polarizers in an RFOG are used to force the resonator to only allow one polarization in the cavity. The fiber resonance typically allows two polarizations for propagation in the cavity. By mis-aligning one of the polarizers away from its eigen polarization state, additional cavity loss is created. By modulating the misalignment, a loss modulation is generated. For example, an angle of one polarizer can be adjusted with respect to an angle of the other polarizer to modulate a cavity loss in the resonator.

Further details related to the present methods and systems are described as follows and with reference to the drawings.

FIG. 1 is flow diagram of a method 100 for reducing or eliminating a Kerr effect bias sensitivity in an RFOG by using common intensity modulation, according to one exemplary implementation. The method 100 is applicable to an RFOG that generally comprises an optical resonator in optical communication with a first light source and a second light source, such as laser devices. The first light source emits a first optical signal at a first power level in a clockwise (CW) direction, and the second light source emits a second optical signal at a second power level in a counter-clockwise (CCW) direction.

The method 100 comprises adding a common intensity modulation to the first optical signal emitted from the first light source at the first power level, to adjust the first power level and produce an intensity modulated CW signal (block 110); and adding the common intensity modulation to the second optical signal emitted from the second light source at the second power level, to adjust the second power level and produce an intensity modulated CCW signal (block 120). The method 100 further includes introducing the intensity modulated CW signal into the optical resonator such that the intensity modulated CW signal propagates in a CW direction in the optical resonator (block 130); introducing the intensity modulated CCW signal into the optical resonator such that the intensity modulated CCW signal propagates in a CCW direction in the optical resonator (block 140); and detecting rotation rate signals that are output from the optical resonator at a common intensity modulation frequency (block 150).

As shown in FIG. 1, method 100 adjusts a power level ratio between the first and second power levels of the first and second optical signals based on the common intensity modulation frequency, to determine a modified power level ratio value where a Kerr effect bias instability due to an asymmetrical loss distribution is reduced or eliminated (block 160). The method 100 maintains the modified power level ratio value in the RFOG such that the Kerr effect bias instability is reduced or eliminated (block 170).

Figure 2:
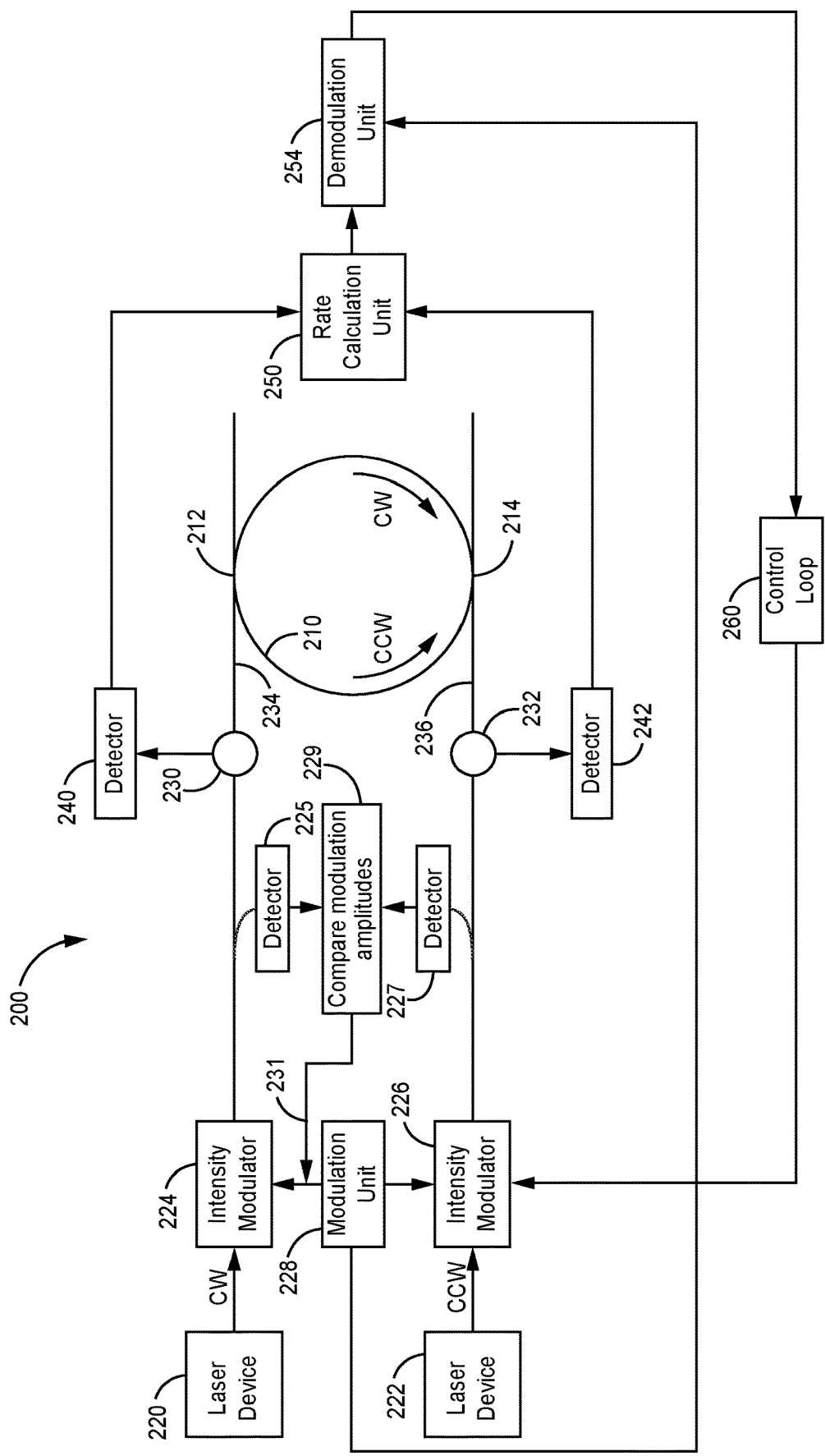
FIG. 2 is a block diagram of a RFOG according to one embodiment, which is configured to reduce or eliminate Kerr effect bias sensitivity by using common intensity modulation.

FIG. 2 is a schematic illustration of a RFOG 200 according to one embodiment, which is configured to reduce or eliminate the Kerr effect bias sensitivity, such as by using common intensity modulation as shown in the method of FIG. 1. The RFOG 200 includes an optical resonator 210, such as fiber optic ring resonator, which is in optical communication with a first laser device 220, and a second laser device 222, through an optical path. In one embodiment, optical resonator 210 can be a fiber optic coil wound around a core and about an axis around which rotation is sensed. In another embodiment, optical resonator 210 can be formed on an optical chip using waveguides.

A first intensity modulator 224 is optically coupled between an output of first laser device 220 and a first optical circulator 230, which is optically coupled to optical resonator 210 through a first bus waveguide 234. A second intensity modulator 226 is optically coupled between an output of second laser device 222 and a second optical circulator 232, which is optically coupled to optical resonator 210 through a second bus waveguide 236. The first bus waveguide 234 is coupled to optical resonator 210 at a first coupling region 212 on a first side of optical resonator 210. The second bus waveguide 236 is coupled to optical resonator 210 at a second coupling region 214 on a second side of optical resonator 210.

As shown in FIG. 2, a modulation unit 228 is operatively coupled to first and second intensity modulators 224, 226. The modulation unit 228 is configured to send a common intensity modulation signal to first and second intensity modulators 224, 226. Some of the optical power from the two beams from laser devices 220 and 222 is tapped from intensity modulators 224 and 226 and sent to a pair of respective detectors 225 and 227, which measure the beam modulation amplitudes separately (modulation amplitude=modulated power/DC power). Then, the modulation amplitudes are compared between the two beams (block 229). A feedback loop 231 is used to ensure that the two beams have the same modulation amplitude. The foregoing structure provides an example of a means to equalize the modulation amplitude between the two beams.

A first optical detector 240 is in optical communication with optical resonator 210 through first optical circulator 230. A second optical detector 242 is in optical communication with optical resonator 210 through second optical circulator 232. A rate calculation unit 250 is configured to receive electrical signals output from first and second optical detectors 240, 242, and calculate a rotation rate signal for RFOG 200. A demodulation unit 254 is configured to receive the rate signal output from rate calculation unit 250, and the common intensity modulation signal from modulation unit 228.

A control loop 260 is operatively coupled between an output of demodulation unit 254 and an input of second intensity modulator 226. In an alternative embodiment, control loop 260 can be operatively coupled between an output of demodulation unit 254 and an input of first intensity modulator 224.

During operation of RFOG 200, first laser device 220 emits a first optical signal that propagates in a clockwise (CW) direction to an input of first intensity modulator 224. The first intensity modulator 224 varies the optical power of the first optical signal, based on the common intensity modulation signal from modulation unit 228, to produce an intensity modulated CW signal. The intensity modulated CW signal is sent to optical resonator 210 through first optical circulator 230 and first bus waveguide 234. The intensity modulated CW signal is coupled into optical resonator 210 at coupling region 212 and propagates in a CW direction in optical resonator 210.

The second laser device 222 emits a second optical signal that propagates in a counter-clockwise (CCW) direction to an input of second intensity modulator 226. The second intensity modulator 226 varies the optical power of the second optical signal, based on the common intensity modulation signal from modulation unit 228, to produce an intensity modulated CCW signal. The intensity modulated CCW signal is sent to optical resonator 210 through second optical circulator 232 and second bus waveguide 236. The intensity modulated CCW signal is coupled into optical resonator 210 at coupling region 214 and propagates in a CCW direction in optical resonator 210.

The first optical detector 240 receives the intensity modulated CCW signal, which is coupled out of optical resonator 210 at coupling region 214 into bus waveguide 234 and through first optical circulator 230. The second optical detector 242 receives the intensity modulated CW signal, which is coupled out of optical resonator 210 at coupling region 214 into bus waveguide 236 and through second optical circulator 232. The first and second optical detectors 240, 242 convert the received signals to electrical signals, which are sent to rate calculation unit 250 for further processing to determine the rotation rate. The demodulation unit 254 receives a rate signal output from rate calculation unit 250, and the common intensity modulation signal from modulation unit 228. The rate signal has a sine wave at the common intensity modulation frequency when the CW and CCW power is not balanced for unevenly distributed Kerr effects. The demodulation unit 254 uses the received rate signal to compute the amplitude of the sine wave at the common intensity modulation frequency.

The control loop 260 receives an output signal from demodulation unit 254, which is used to adjust the power level ratio to balance the CW and CCW input power, to reduce or eliminate the sine wave in the rate signal. In one embodiment, control loop 260 balances the CW and CCW input power by adjusting second intensity modulator 226 to control a direct current (DC) laser power in the CCW direction. In an alternative embodiment, control loop 260 balances the CW and CCW input power by adjusting first intensity modulator 224 to control the DC laser power in the CW direction. The control loop 260 determines a modified power level ratio value where a Kerr effect bias instability due to an asymmetrical loss distribution in RFOG 200 is reduced or eliminated, and maintains the modified power level ratio value in RFOG 200. The control loop 260 operates as a feedback loop to determine the modified power level ratio value where the bias instability is reduced or eliminated such as going to zero. This modified power level ratio value can then be locked in by control loop 260.

Figure 3:
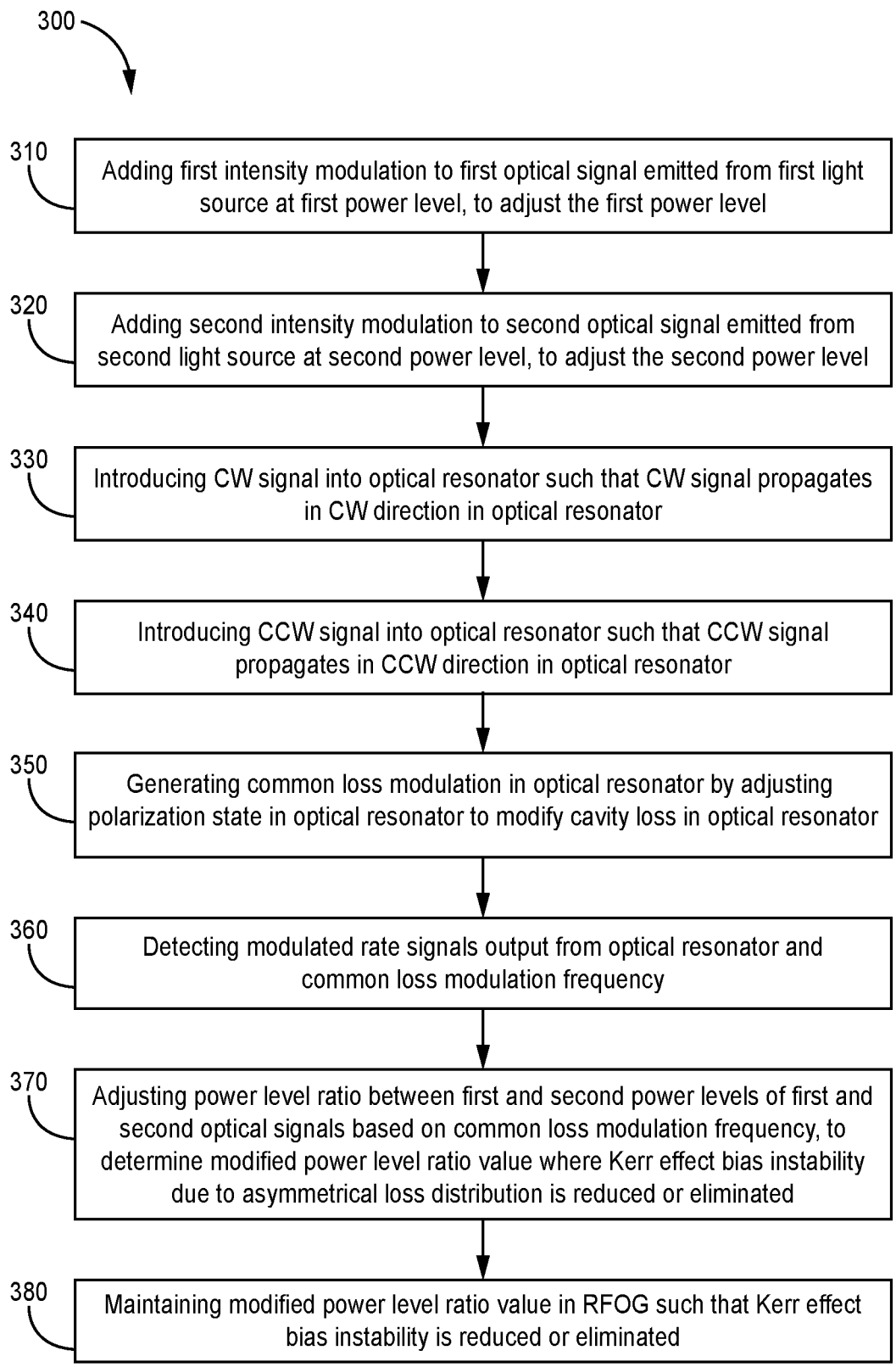
FIG. 3 is flow diagram of a method for reducing or eliminating Kerr effect bias sensitivity in a RFOG by employing common loss modulation, according to an exemplary implementation.

FIG. 3 is flow diagram of a method 300 for reducing or eliminating a Kerr effect bias sensitivity in an RFOG by employing common loss modulation, according to an exemplary implementation. The method 300 is applicable to an RFOG that generally comprises an optical resonator in optical communication with a first light source and a second light source, such as laser devices. The first light source emits a first optical signal at a first power level in a CW direction, and the second light source emits a second optical signal at a second power level in a CCW direction.

The method 300 comprises adding a first intensity modulation to the first optical signal emitted from the first light source, to adjust the first power level (block 310); and adding a second intensity modulation to the second optical signal emitted from the second light source, to adjust the second power level (block 320). For example, a first intensity modulator or variable optical attenuator (VOA) can be used to adjust the first power level of the first optical signal and produce a CW signal; and a second intensity modulator or VOA can be used to adjust the second power level of the second optical signal and produce a CCW signal.

The method 300 further includes introducing the CW signal into the optical resonator such that the CW signal propagates in a CW direction in the optical resonator (block 330); and introducing the CCW signal into the optical resonator such that the CCW signal propagates in a CCW direction in the optical resonator (block 340). The method 300 generates a common loss modulation in the optical resonator by adjusting a polarization state in the optical resonator to modify a cavity loss in the optical resonator (block 350); and detects modulated rate signals that are output from the optical resonator and a common loss modulation frequency (block 360).

As shown in FIG. 3, method 300 adjusts a power level ratio between the first and second power levels of the first and second optical signals based on the common loss modulation frequency, to determine a modified power level ratio value where a Kerr effect bias instability due to an asymmetrical loss distribution is reduced or eliminated (block 370). The method 300 maintains the modified power level ratio value in the RFOG such that the Kerr effect bias instability is reduced or eliminated. (block 380).

Figure 4:
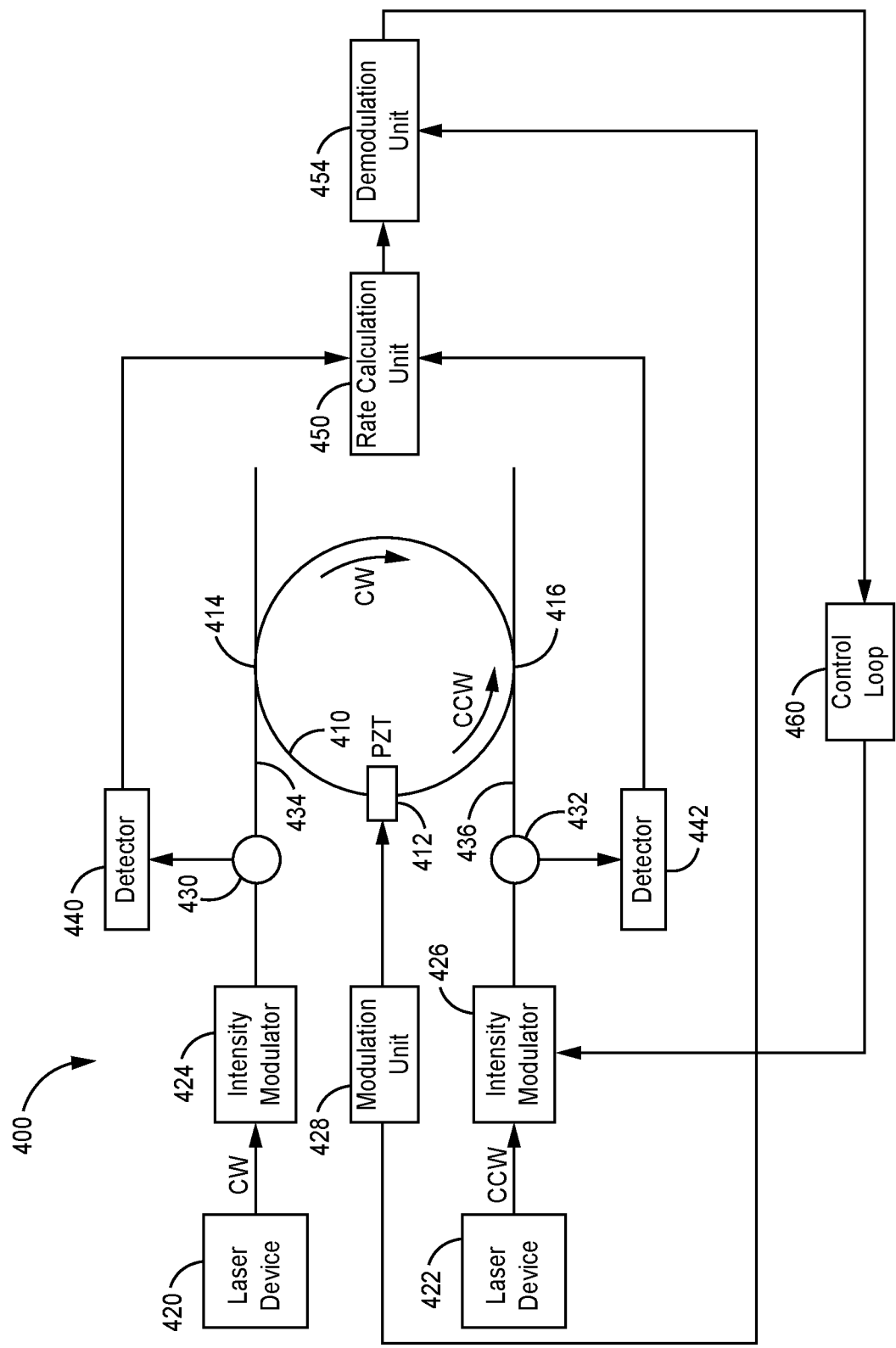
FIG. 4 is a block diagram of a RFOG according to another embodiment, which is configured to reduce or eliminate the Kerr effect bias sensitivity by using common loss modulation.

FIG. 4 is a schematic illustration of a RFOG 400 according to another embodiment, which is configured to reduce or eliminate the Kerr effect bias sensitivity, such as by using common loss modulation as shown in the method of FIG. 3. The RFOG 400 includes an optical resonator 410, such as a fiber optic ring resonator, which is in optical communication with a first laser device 420, and a second laser device 422. The optical resonator 410 also includes a piezoelectric transducer (PZT) 412, which is configured to modulate the cavity loss of optical resonator 410 via polarization variations. In one embodiment, PZT 412 is attached to a piece of optical fiber of optical resonator 410, such that PZT 412 is configured to sinusoidally press the optical fiber at a modulation frequency. Such a modulation varies the polarization state of the cavity and modulates the cavity loss.

A first intensity modulator 424 (or VOA) is optically coupled between an output of first laser device 420 and a first optical circulator 430. A second intensity modulator 426 (or VOA) is optically coupled between an output of second laser device 422 and a second optical circulator 432. The first optical circulator 430 is optically coupled to optical resonator 410 through a first bus waveguide 434. The second optical circulator 432 is optically coupled to optical resonator 410 through a second bus waveguide 436. The first bus waveguide 434 is optically coupled to optical resonator 410 at a first coupling region 414 on a first side of optical resonator 410. The second bus waveguide 436 is optically coupled to optical resonator 410 at a second coupling region 416 on a second side of optical resonator 410.

As illustrated in FIG. 4, a modulation unit 428 is operatively coupled to PZT 412. The modulation unit 428 is configured to send a common cavity loss modulation signal such as a sine wave signal to PZT 412. A first optical detector 440 is in optical communication with optical resonator 410 through first optical circulator 430. A second optical detector 442 is in optical communication with optical resonator 410 through second optical circulator 432. A rate calculation unit 450 is configured to receive electrical signals output from first and second optical detectors 440, 442, and calculate a rotation rate signal for RFOG 400. A demodulation unit 454 is configured to receive the rate signal output from rate calculation unit 450, and the sine wave signal from modulation unit 428.

A control loop 460 is operatively coupled between an output of demodulation unit 454 and an input of second intensity modulator 426. In an alternative embodiment, control loop 460 can be operatively coupled between an output of demodulation unit 454 and an input of first intensity modulator 424.

During operation of RFOG 400, first laser device 420 emits a first optical signal that propagates in a CW direction to first intensity modulator 424, which outputs a CW signal that is sent to optical resonator 410 through first optical circulator 430 and first bus waveguide 434. The CW signal is coupled into optical resonator 410 at coupling region 414 and propagates in a CW direction in optical resonator 410.

The second laser device 422 emits a second optical signal that propagates in a CCW direction to second intensity modulator 426, which outputs a CCW signal that is sent to optical resonator 410 through second optical circulator 432 and second bus waveguide 436. The CCW signal is coupled into optical resonator 410 at coupling region 416 and propagates in a CCW direction in optical resonator 410.

The modulation unit 428 sends the sine wave signal to PZT 412, which applies pressure to the optical fiber of optical resonator 410 to adjust a cavity loss due to a polarization change. The cavity eigen polarization is defined by a polarizer in the gyroscope. Any polarization modes that do not align with the eigen mode experience high loss in the cavity. The pressure applied to the optical fiber via PZT 412 changes the fiber birefringence and polarization state of optical resonator 410. The change in the polarization state modifies the cavity loss in optical resonator 410 to produce a common loss modulation, which generates a bias modulation at the same modulation frequency as the common loss modulation. The bias modulation can be minimized or eliminated by balancing the CW and CCW input power.

For example, first optical detector 440 receives the modulated CCW signal with the common loss modulation, which is coupled out of optical resonator 410 at coupling region 414 into bus waveguide 434 and through first optical circulator 430. The second optical detector 442 receives the modulated CW signal with the common loss modulation, which is coupled out of optical resonator 410 at coupling region 416 into bus waveguide 436 and through second optical circulator 432. The first and second optical detectors 440, 442 convert the received signals to electrical signals, which are sent to rate calculation unit 450 for further processing to determine the rotation rate. The demodulation unit 454 receives a rate signal output from rate calculation unit 450, and the common cavity loss modulation signal from modulation unit 428. The rate signal has a sine wave at the common loss modulation frequency. The demodulation unit 454 uses the received signals to compute the sine wave at the common loss modulation frequency.

The control loop 460 receives an output signal from demodulation unit 454, which is used to adjust the power level ratio to balance the CW and CCW input power, to reduce or eliminate the sine wave in the rate signal. In one embodiment, control loop 460 balances the CW and CCW input power by adjusting second intensity modulator 426 to control the DC laser power in the CCW direction. In an alternative embodiment, control loop 460 balances the CW and CCW input power by adjusting first intensity modulator 424 to control the DC laser power in the CW direction. The control loop 460 determines a modified power level ratio value where a Kerr effect bias instability due to an asymmetrical loss distribution in RFOG 400 is reduced or eliminated, and maintains the modified power level ratio value in RFOG 400.

Figure 5:
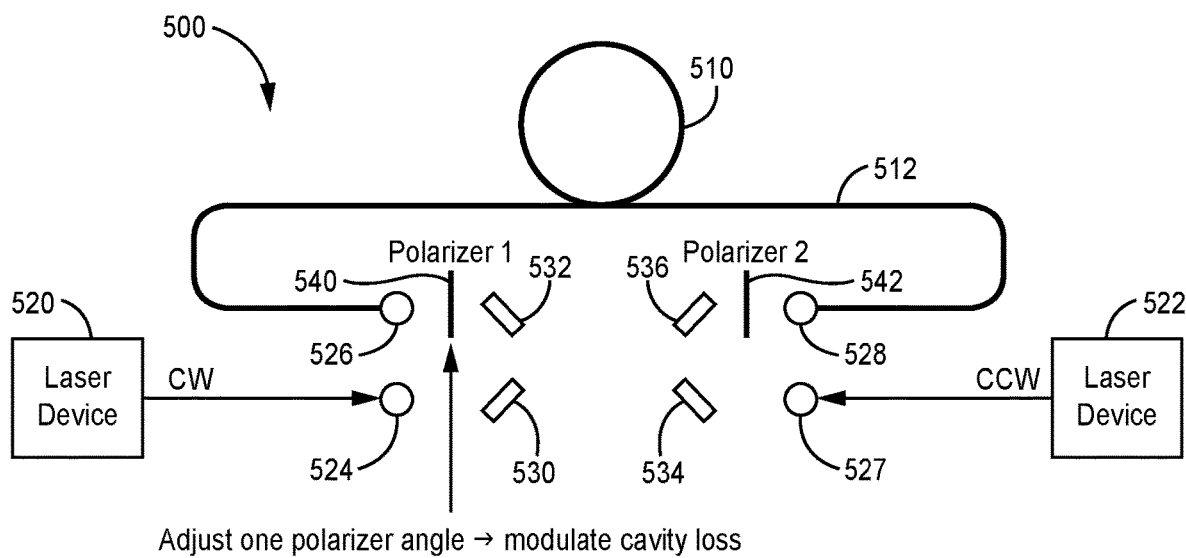
FIG. 5 is a block diagram of a RFOG according to an alternative embodiment, which is configured to reduce or eliminate the Kerr effect bias sensitivity by using common loss modulation.

FIG. 5 is a schematic illustration of a RFOG 500 according to an alternative embodiment, which is configured to reduce or eliminate the Kerr effect bias sensitivity, such as by using common loss modulation. The RFOG 500 includes an optical resonator 510, such as a fiber optic ring resonator, which is in optical communication with a first laser device 520, and a second laser device 522, through an optical path. The optical resonator 510 is coupled to a bus waveguide 512 such as an optical fiber. The first laser device 520 is configured to emit a CW beam at a first power level, and the second laser device 522 is configured to emit a CCW beam at a second power level.

Various discrete optical components can be employed to direct the CW and CCW beams to optical resonator 510. For example, a first optical coupler 524 can direct the CW beam to a first set of mirror reflectors 530, 532, which reflect the CW beam to a first polarizer 540. The first polarizer 540 can be placed in the cavity close to a CW input configured to receive the CW beam. The first polarizer 540 passes a first polarized beam to a second optical coupler 526, which couples the first polarized beam into bus waveguide 512 for propagation in optical resonator 510. A third optical coupler 527 directs the CCW beam to a second set of mirror reflectors 534, 536, which reflect the CCW beam to a second polarizer 542. The second polarizer 542 can be placed in the cavity close to a CCW input configured to receive the CCW beam. The second polarizer 542 passes a second polarized beam to a fourth optical coupler 528, which couples the second polarized beam into bus waveguide 512 for propagation in optical resonator 510.

A common loss modulation can be generated in optical resonator 510 by adjusting a polarization state in optical resonator 510 to modify a cavity loss in optical resonator 510. The polarization state in optical resonator 510 is adjusted by producing a misalignment of one of the first or second polarizers 540, 542 away from its eigen polarization state to modify the cavity loss in optical resonator 540. The misalignment is modulated to generate a common loss modulation frequency. The misalignment can be produced by using micro-electro-mechanical systems (MEMS) actuated polarizers.

For example, an angle of first polarizer 540 can be adjusted with respect to a resonant polarization mode, or an angle of second polarizer 542 can be adjusted with respect to a resonant polarization mode. A power level ratio between the first and second power levels of the CW and CCW beams can be adjusted based on the common loss modulation frequency, to determine a modified power level ratio value where a Kerr effect bias instability in RFOG 500 is reduced or eliminated.

Additional details and examples related to the present approach are described as follows.

Simulations have shown that the CW and CCW beams in a RFOG have different intensity distributions when the RFOG has asymmetrical loss distribution. Such non-reciprocal intensity distribution makes the RFOG sensitive to both common power and common loss variations via the Kerr effect. This effect is illustrated in FIG. 6, which is a diagram representing the asymmetric loss distribution in an optical fiber. For a CW beam 610 with a CW intensity ($I_{cw}$), a loss 612 in the resonator is represented as $I_{cw}$–$I_{loss}$. For a CCW beam 620 with a CCW intensity ($I_{ccw}$), a loss 622 in the resonator is represented as $I_{ccw}$–$I_{loss}$. The asymmetric loss p $\eta_{loss}$ (%) in the resonator between losses $L_1$ and $L_2$ is indicated at 630.

FIG. 6 indicates that the asymmetric loss distribution in the resonator can lead to an asymmetric Kerr effect, which in turn leads to bias even with common intensity fluctuation and loss fluctuation. A nonreciprocal phase change can be represented by the expression:

$$\Delta\phi = \phi_{cw} - \phi_{ccw},$$

with $$\Delta\phi = n_2 L_1 \times [I_{cw} - I_{ccw}(1 - \eta_{loss})] + n_2 L_2 \times [I_{cw}(1 - \eta_{loss}) - I_{ccw}] =$$

$$n_2(L_1 + L_2) \times (I_{cw} - I_{ccw}) + \eta_{loss} \times n_2(L_1 I_{ccw} - L_2 I_{cw}).$$

The above expression: $n_2(L_1+L_2)\times(I_{cw}-I_{ccw})$ represents the primary Kerr effect, which is due to differential power fluctuations. The above expression: $\eta_{loss}\times n_2(L_1 I_{ccw}-L_2 I_{cw})$ represents the asymmetric Kerr effect, which is due to common loss/power fluctuations.

Even with both the CW and CCW beams under the same intensity modulation, this can still lead to a bias in the RFOG. In one example, a CW input has zero dB coupling loss, while a CCW input has a 3 dB coupling loss in an RFOG. Assuming both the CW and CCW ports have a 1 mW input power with 10% intensity modulation at frequency $f_0$, the CW loop sees 100 μW power variation while the CCW loop only experiences 50 μW power variation. This power difference will generate a bias modulated at $f_0$ due to the Kerr effect. The power ratio can be adjusted to reduce or eliminate the bias. In this example, the CCW power can be doubled to eliminate the modulated bias signal.

FIG. 7A is an example graph of the bias with respect to time for CW and CCW beams in a resonator of an RFOG, prior to application of the present approach of adjusting the power ratio to reduce bias sensitivity to common loss change and common power fluctuations. A plot 710 in the graph of FIG. 7A has a sinusoidal shape for the bias with respect to time. In this example, the CW and CCW beams are under the same intensity modulation, the CW power is equal to the CCW power, and the common modulation leads to a bias modulation.

FIG. 7B is an example graph of the bias with respect to time for CW and CCW beams in the resonator of the RFOG, after application of the present approach of adjusting the power ratio to reduce bias sensitivity to common loss change and common power fluctuations. A plot 720 in the graph of FIG. 7B shows a substantial reduction in sinusoidal shape for the bias with respect to time. In this case, the CW and CCW beams are under same intensity modulation, but the power ratio is adjusted such that CW power is equal to 0.957×CCW power. This results in the bias modulation being substantially reduced (in this case, a 38,000 time reduction). Therefore, by adjusting the ratio between the CW and CCW power, the present method can reduce the bias due to common intensity fluctuation and common loss variation.

Figure 8:
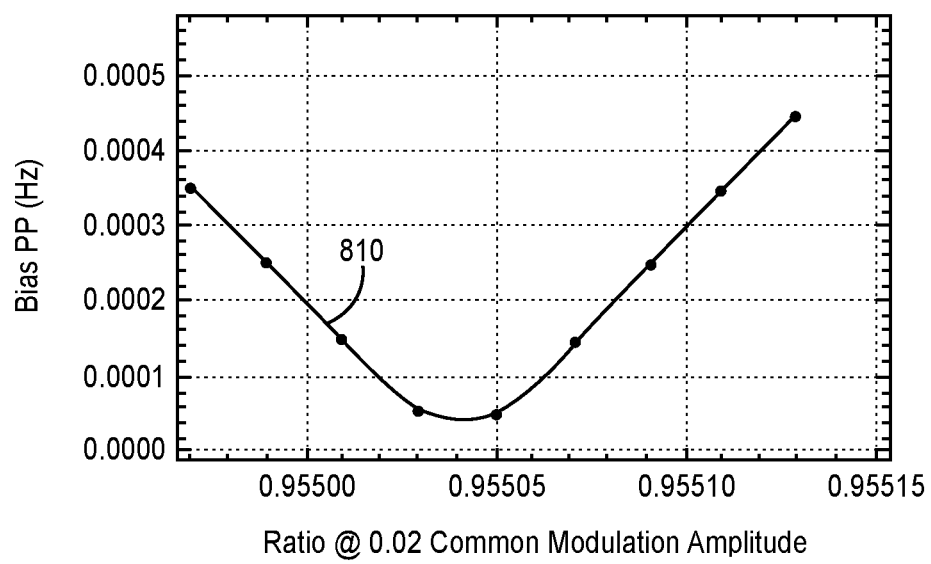
FIG. 8 is an example graph of the bias peak to peak modulation with respect to a power ratio for the beams in an RFOG, with the power ratio being adjusted to reduce bias sensitivity.

FIG. 8 is an example graph of the bias peak to peak (PP) modulation with respect to a power ratio at a 0.02 common modulation amplitude, with the power ratio being adjusted to reduce bias sensitivity. As indicated by a plot 810 in the graph of FIG. 8, by adjusting the power ratio between the CW and CCW power, the bias modulation peak to peak value is reduced to almost zero. In this case, the total ratio stability is about 170 ppm.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: providing a resonator fiber optic gyroscope (RFOG) that comprises an optical resonator in optical communication with a first light source that emits a first optical signal at a first power level in a clockwise (CW) direction, and a second light source that emits a second optical signal at a second power level in a counterclockwise (CCW) direction; adding a common intensity modulation to the first optical signal emitted from the first light source, to adjust the first power level and produce an intensity modulated CW signal; adding the same common intensity modulation to the second optical signal emitted from the second light source, to adjust the second power level and produce an intensity modulated CCW signal; providing means to equalize a modulation amplitude between the first and second optical signals; introducing the intensity modulated CW signal into the optical resonator such that the intensity modulated CW signal propagates in a CW direction in the optical resonator; introducing the intensity modulated CCW signal into the optical resonator such that the intensity modulated CCW signal propagates in a CCW direction in the optical resonator; detecting modulated rate signals that are output from the optical resonator at a common intensity modulation frequency; adjusting a power level ratio between the first and second power levels of the first and second optical signals based on the common intensity modulation frequency, to determine a modified power level ratio value where a Kerr effect bias instability due to an asymmetrical loss distribution in the RFOG is reduced or eliminated; and maintaining the modified power level ratio value in the RFOG such that the Kerr effect bias instability is reduced or eliminated.

Example 2 includes the method of Example 1, wherein the optical resonator comprises a ring resonator; the first light source comprises a first laser device optically coupled to a first intensity modulator; and the second light source comprises a second laser device optically coupled to a second intensity modulator.

Example 3 includes the method of Example 2, wherein the first intensity modulator receives the first optical signal from the first laser device, and produces the intensity modulated CW signal; and the second intensity modulator receives the second optical signal from the second laser device, and produces the intensity modulated CCW signal.

Example 4 includes the method of Example 3, wherein the RFOG further comprises: a modulation unit operatively coupled to the first and second intensity modulators, wherein the modulation unit sends a common intensity modulation signal to the first and second intensity modulators; a first optical detector in optical communication with the optical resonator, wherein the first optical detector receives the intensity modulated CCW signal from the optical resonator; a second optical detector in optical communication with the optical resonator, wherein the second optical detector receives the intensity modulated CW signal from the optical resonator; a rate calculation unit that receives output signals from the first and second optical detectors, and calculates a rotation rate signal for the RFOG; a demodulation unit that receives the rotation rate signal from the rate calculation unit, and the common intensity modulation signal from the modulation unit; and a control loop operatively coupled between an output of the demodulation unit and an input of at least one of the intensity modulators.

Example 5 includes the method of Example 4, wherein the rotation rate signal has a sine wave at the common intensity modulation frequency; and the power level ratio is adjusted by the control loop to balance the first and second power levels, to reduce or eliminate the sine wave in the rotation rate signal.

Example 6 includes a method comprising: providing a RFOG that comprises an optical resonator in optical communication with a first light source that emits a first optical signal at a first power level in a CW direction, and a second light source that emits a second optical signal at a second power level in a CCW direction; using a first intensity modulator or variable optical attenuator (VOA) to adjust the first power level of the first optical signal and produce a CW signal; using a second intensity modulator or VOA to adjust the second power level of the second optical signal and produce a CCW signal; introducing the CW signal into the optical resonator such that the CW signal propagates in a CW direction in the optical resonator; introducing the CCW signal into the optical resonator such that the CCW signal propagates in a CCW direction in the optical resonator; generating a common loss modulation in the optical resonator by adjusting a polarization state in the optical resonator to modify a cavity loss in the optical resonator; detecting modulated rate signals that are output from the optical resonator and a common loss modulation frequency; adjusting a power level ratio between the first and second power levels of the first and second optical signals based on the common loss modulation frequency, to determine a modified power level ratio value where a Kerr effect bias instability due to an asymmetrical loss distribution in the RFOG is reduced or eliminated; and maintaining the modified power level ratio value in the RFOG such that the Kerr effect bias instability is reduced or eliminated.

Example 7 includes the method of Example 6, wherein the optical resonator comprises a ring resonator; the first light source comprises a first laser device; and the second light source comprises a second laser device.

Example 8 includes the method of Example 7, wherein the RFOG further comprises: a modulation unit operatively coupled to the optical resonator, wherein the modulation unit generates a common cavity loss modulation signal.

Example 9 includes the method of Example 8, wherein the RFOG further comprises: a piezoelectric transducer (PZT) coupled to a fiber of the optical resonator; wherein the modulation unit sends the common cavity loss modulation signal to the PZT.

Example 10 includes the method of Example 9, wherein the polarization state in the optical resonator is adjusted by a process comprising: activating the PZT to apply pressure to a portion of the fiber of the optical resonator to change a fiber birefringence and the polarization state of the optical resonator; wherein the change in the polarization state of the optical resonator modifies the cavity loss to generate the common loss modulation.

Example 11 includes the method of Example 7, wherein the RFOG further comprises: a first polarizer placed in a cavity and close to a CW input configured to receive the CW signal, and pass the CW signal to the optical resonator; and a second polarizer placed in the cavity and close to a CCW input configured to receive the CCW signal, and pass the CCW signal to the optical resonator.

Example 12 includes the method of Example 11, wherein the polarization state in the optical resonator is adjusted by a process comprising: producing a misalignment of one of the first or second polarizers away from its eigen polarization state to modify the cavity loss in the optical resonator; and modulating the misalignment to generate the common loss modulation.

Example 13 includes the method of Example 12, wherein the misalignment is produced by a process comprising: adjusting an angle of the first polarizer with respect to its eigen polarization state; or adjusting an angle of the second polarizer with respect to its eigen polarization state.

Example 14 includes the method of Example 8, wherein the RFOG further comprises: a first optical detector in optical communication with the optical resonator, wherein the first optical detector receives the CCW signal from the optical resonator; a second optical detector in optical communication with the optical resonator, wherein the second optical detector receives the CW signal from the optical resonator; a rate calculation unit that receives output signals from the first and second optical detectors, and calculates a rotation rate signal for the RFOG; a demodulation unit that receives the rotation rate signal from the rate calculation unit, and the common cavity loss modulation signal from the modulation unit; and a control loop operatively coupled between an output of the demodulation unit and an input of at least one of the intensity modulators.

Example 15 includes the method of Example 14, wherein the rotation rate signal has a sine wave at the common loss modulation frequency; and the power level ratio is adjusted by the control loop to balance the first and second power levels, to reduce or eliminate the sine wave in the rotation rate signal.

Example 16 includes a RFOG, comprising: a first laser device configured to emit a first optical signal at a first power level in a CW direction; a first intensity modulator configured to receive the first optical signal from the first laser device, the first intensity modulator operative to adjust the first power level of the first optical signal and to output a CW signal; a second laser device configured to emit a second optical signal at a second power level in a CCW direction; a second intensity modulator configured to receive the second optical signal from the second laser device, the second intensity modulator operative to adjust the second power level of the second optical signal and to output a CCW signal; an optical resonator in optical communication with the first laser device through the first intensity modulator and with the second laser device through the second intensity modulator; wherein the CW signal is optically coupled into the optical resonator and propagates in the CW direction in the optical resonator; wherein the CCW signal is optically coupled into the optical resonator and propagates in the CCW direction in the optical resonator; a first optical detector in optical communication with the optical resonator, and configured to receive the CCW signal from the optical resonator; a second optical detector in optical communication with the optical resonator and configured to receive the CW signal from the optical resonator; a rate calculation unit configured to receive output signals from the first and second optical detectors, and to calculate a rotation rate signal for the RFOG; a demodulation unit configured to receive the rotation rate signal from the rate calculation unit; a modulation unit configured to send a common modulation signal to the demodulation unit; and a control loop operatively coupled between an output of the demodulation unit and an input of at least one of the intensity modulators; wherein the control loop is operative to: adjust a power level ratio between the first power level and the second power level to determine a modified power level ratio value where a Kerr effect bias instability due to an asymmetrical loss distribution in the RFOG is reduced or eliminated; and maintain the modified power level ratio value in the RFOG where the Kerr effect bias instability is reduced or eliminated.

Example 17 includes the RFOG of Example 16, wherein the control loop is operative to adjust the power level ratio between the first and second power levels based on a common intensity modulation frequency.

Example 18 includes the RFOG of Example 16, wherein the control loop is operative to adjust the power level ratio between the first and second power levels based on a common loss modulation frequency generated in the optical resonator by adjusting a polarization state in the optical resonator to modify a cavity loss in the optical resonator.

Example 19 includes the RFOG of Example 18, further comprising: a PZT coupled to a fiber of the optical resonator; wherein the modulation unit is configured to send the common modulation signal to the PZT; wherein the polarization state in the optical resonator is adjusted by activating the PZT to apply pressure to a portion of the fiber of the optical resonator to change a fiber birefringence and the polarization state of the optical resonator.

Example 20 includes the RFOG of Example 18, further comprising: a first polarizer configured to receive the CW signal, and pass the CW signal to the optical resonator; and a second polarizer configured to receive the CCW signal, and pass the CCW signal to the optical resonator; wherein the polarization state in the optical resonator is adjusted by producing a misalignment of one of the first or second polarizers away from its eigen polarization state to modify the cavity loss in the optical resonator, and modulating the misalignment to generate the common loss modulation frequency.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
providing a resonator fiber optic gyroscope (RFOG) that comprises an optical resonator in optical communication with a first light source that emits a first optical signal at a first power level in a clockwise (CW) direction, and a second light source that emits a second optical signal at a second power level in a counterclockwise (CCW) direction;

adding a common intensity modulation to the first optical signal emitted from the first light source, to adjust the first power level and produce an intensity modulated CW signal;

adding the same common intensity modulation to the second optical signal emitted from the second light source, to adjust the second power level and produce an intensity modulated CCW signal;

providing means to equalize a modulation amplitude between the first and second optical signals;

introducing the intensity modulated CW signal into the optical resonator such that the intensity modulated CW signal propagates in a CW direction in the optical resonator;

introducing the intensity modulated CCW signal into the optical resonator such that the intensity modulated CCW signal propagates in a CCW direction in the optical resonator;

detecting modulated rate signals that are output from the optical resonator at a common intensity modulation frequency;

adjusting a power level ratio between the first and second power levels of the first and second optical signals based on the common intensity modulation frequency, to determine a modified power level ratio value where a Kerr effect bias instability due to an asymmetrical loss distribution in the RFOG is reduced or eliminated; and maintaining the modified power level ratio value in the RFOG such that the Kerr effect bias instability is reduced or eliminated.

2. The method of claim 1, wherein:
the optical resonator comprises a ring resonator;
the first light source comprises a first laser device optically coupled to a first intensity modulator; and
the second light source comprises a second laser device optically coupled to a second intensity modulator.

3. The method of claim 2, wherein:
the first intensity modulator receives the first optical signal from the first laser device, and produces the intensity modulated CW signal; and
the second intensity modulator receives the second optical signal from the second laser device, and produces the intensity modulated CCW signal.

4. The method of claim 3, wherein the RFOG further comprises:
a modulation unit operatively coupled to the first and second intensity modulators, wherein the modulation unit sends a common intensity modulation signal to the first and second intensity modulators;
a first optical detector in optical communication with the optical resonator, wherein the first optical detector receives the intensity modulated CCW signal from the optical resonator;
a second optical detector in optical communication with the optical resonator, wherein the second optical detector receives the intensity modulated CW signal from the optical resonator;
a rate calculation unit that receives output signals from the first and second optical detectors, and calculates a rotation rate signal for the RFOG;
a demodulation unit that receives the rotation rate signal from the rate calculation unit, and the common intensity modulation signal from the modulation unit; and
a control loop operatively coupled between an output of the demodulation unit and an input of at least one of the intensity modulators.

5. The method of claim 4, wherein:
the rotation rate signal has a sine wave at the common intensity modulation frequency; and
the power level ratio is adjusted by the control loop to balance the first and second power levels, to reduce or eliminate the sine wave in the rotation rate signal.

6. A method comprising:
providing a resonator fiber optic gyroscope (RFOG) that comprises an optical resonator in optical communication with a first light source that emits a first optical signal at a first power level in a clockwise (CW) direction, and a second light source that emits a second optical signal at a second power level in a counter-clockwise (CCW) direction;
using a first intensity modulator or variable optical attenuator (VOA) to adjust the first power level of the first optical signal and produce a CW signal;
using a second intensity modulator or VOA to adjust the second power level of the second optical signal and produce a CCW signal;
introducing the CW signal into the optical resonator such that the CW signal propagates in a CW direction in the optical resonator;
introducing the CCW signal into the optical resonator such that the CCW signal propagates in a CCW direction in the optical resonator;
generating a common loss modulation in the optical resonator by adjusting a polarization state in the optical resonator to modify a cavity loss in the optical resonator;
detecting modulated rate signals that are output from the optical resonator and a common loss modulation frequency;
adjusting a power level ratio between the first and second power levels of the first and second optical signals based on the common loss modulation frequency, to determine a modified power level ratio value where a Kerr effect bias instability due to an asymmetrical loss distribution in the RFOG is reduced or eliminated; and
maintaining the modified power level ratio value in the RFOG such that the Kerr effect bias instability is reduced or eliminated.

7. The method of claim 6, wherein:
the optical resonator comprises a ring resonator;
the first light source comprises a first laser device; and
the second light source comprises a second laser device.

8. The method of claim 7, wherein the RFOG further comprises:
a modulation unit operatively coupled to the optical resonator, wherein the modulation unit generates a common cavity loss modulation signal.

9. The method of claim 8, wherein the RFOG further comprises:
a piezoelectric transducer (PZT) coupled to a fiber of the optical resonator;
wherein the modulation unit sends the common cavity loss modulation signal to the PZT.

10. The method of claim 9, wherein the polarization state in the optical resonator is adjusted by a process comprising:
activating the PZT to apply pressure to a portion of the fiber of the optical resonator to change a fiber birefringence and the polarization state of the optical resonator;
wherein the change in the polarization state of the optical resonator modifies the cavity loss to generate the common loss modulation.

11. The method of claim 8, wherein the RFOG further comprises:
- a first optical detector in optical communication with the optical resonator, wherein the first optical detector receives the CCW signal from the optical resonator;
- a second optical detector in optical communication with the optical resonator, wherein the second optical detector receives the CW signal from the optical resonator;
- a rate calculation unit that receives output signals from the first and second optical detectors, and calculates a rotation rate signal for the RFOG;
- a demodulation unit that receives the rotation rate signal from the rate calculation unit, and the common cavity loss modulation signal from the modulation unit; and
- a control loop operatively coupled between an output of the demodulation unit and an input of at least one of the intensity modulators.

12. The method of claim 11, wherein:
- the rotation rate signal has a sine wave at the common loss modulation frequency; and
- the power level ratio is adjusted by the control loop to balance the first and second power levels, to reduce or eliminate the sine wave in the rotation rate signal.

13. The method of claim 6, wherein the RFOG further comprises:
- a first polarizer placed in a cavity and close to a CW input configured to receive the CW signal, and pass the CW signal to the optical resonator; and
- a second polarizer placed in the cavity and close to a CCW input configured to receive the CCW signal, and pass the CCW signal to the optical resonator.

14. The method of claim 13, wherein the polarization state in the optical resonator is adjusted by a process comprising:
- producing a misalignment of one of the first or second polarizers away from its eigen polarization state to modify the cavity loss in the optical resonator; and
- modulating the misalignment to generate the common loss modulation.

15. The method of claim 14, wherein the misalignment is produced by a process comprising:
- adjusting an angle of the first polarizer with respect to its eigen polarization state; or
- adjusting an angle of the second polarizer with respect to its eigen polarization state.

16. A resonator fiber optic gyroscope (RFOG), comprising:
- a first laser device configured to emit a first optical signal at a first power level in a clockwise (CW) direction;
- a first intensity modulator configured to receive the first optical signal from the first laser device, the first intensity modulator operative to adjust the first power level of the first optical signal and to output a CW signal;
- a second laser device configured to emit a second optical signal at a second power level in a counterclockwise (CCW) direction;
- a second intensity modulator configured to receive the second optical signal from the second laser device, the second intensity modulator operative to adjust the second power level of the second optical signal and to output a CCW signal;
- an optical resonator in optical communication with the first laser device through the first intensity modulator and with the second laser device through the second intensity modulator;
- wherein the CW signal is optically coupled into the optical resonator and propagates in the CW direction in the optical resonator;
- wherein the CCW signal is optically coupled into the optical resonator and propagates in the CCW direction in the optical resonator;
- a first optical detector in optical communication with the optical resonator, and configured to receive the CCW signal from the optical resonator;
- a second optical detector in optical communication with the optical resonator and configured to receive the CW signal from the optical resonator;
- a rate calculation unit configured to receive output signals from the first and second optical detectors, and to calculate a rotation rate signal for the RFOG;
- a demodulation unit configured to receive the rotation rate signal from the rate calculation unit;
- a modulation unit configured to send a common modulation signal to the demodulation unit; and
- a control loop operatively coupled between an output of the demodulation unit and an input of at least one of the intensity modulators;
- wherein the control loop is operative to:
    - adjust a power level ratio between the first power level and the second power level to determine a modified power level ratio value where a Kerr effect bias instability due to an asymmetrical loss distribution in the RFOG is reduced or eliminated; and
    - maintain the modified power level ratio value in the RFOG where the Kerr effect bias instability is reduced or eliminated.

17. The RFOG of claim 16, wherein the control loop is operative to adjust the power level ratio between the first and second power levels based on a common intensity modulation frequency.

18. The RFOG of claim 16, wherein the control loop is operative to adjust the power level ratio between the first and second power levels based on a common loss modulation frequency generated in the optical resonator by adjusting a polarization state in the optical resonator to modify a cavity loss in the optical resonator.

19. The RFOG of claim 18, further comprising:
- a piezoelectric transducer (PZT) coupled to a fiber of the optical resonator;
- wherein the modulation unit is configured to send the common modulation signal to the PZT;
- wherein the polarization state in the optical resonator is adjusted by activating the PZT to apply pressure to a portion of the fiber of the optical resonator to change a fiber birefringence and the polarization state of the optical resonator.

20. The RFOG of claim 18, further comprising:
- a first polarizer configured to receive the CW signal, and pass the CW signal to the optical resonator; and
- a second polarizer configured to receive the CCW signal, and pass the CCW signal to the optical resonator;
- wherein the polarization state in the optical resonator is adjusted by producing a misalignment of one of the first or second polarizers away from its eigen polarization state to modify the cavity loss in the optical resonator, and modulating the misalignment to generate the common loss modulation frequency.

* * * * *